(12) United States Patent
Miyanoo

(10) Patent No.: US 8,055,430 B2
(45) Date of Patent: Nov. 8, 2011

(54) VALVE PERFORMANCE CONTROLLER FOR INTERNAL COMBUSTION ENGINE

(75) Inventor: Yuji Miyanoo, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 421 days.

(21) Appl. No.: 12/514,605

(22) PCT Filed: Dec. 19, 2007

(86) PCT No.: PCT/JP2007/074398
§ 371 (c)(1),
(2), (4) Date: May 13, 2009

(87) PCT Pub. No.: WO2008/075704
PCT Pub. Date: Jun. 26, 2008

(65) Prior Publication Data
US 2010/0313833 A1 Dec. 16, 2010

(30) Foreign Application Priority Data
Dec. 21, 2006 (JP) ................................. 2006-344762

(51) Int. Cl.
*F01L 9/02* (2006.01)
*F01L 1/34* (2006.01)

(52) U.S. Cl. .................. 701/102; 123/90.12; 123/90.15; 123/90.19

(58) Field of Classification Search .................. 701/102; 123/90.12, 90.13, 90.15–90.19
See application file for complete search history.

(56) References Cited

U.S. PATENT DOCUMENTS 3,865,088 A * 2/1975 Links .......................... 123/90.12
6,138,621 A * 10/2000 Albanello et al. ......... 123/90.12
6,530,350 B2 * 3/2003 Chiappini et al. ......... 123/90.12
(Continued)

FOREIGN PATENT DOCUMENTS

JP   2 245406   10/1990
JP     5 1804    1/1993
(Continued)

OTHER PUBLICATIONS

Extended European Search Report issued Mar. 4, 2011, in Application No. / Patent No. 07850868.6-2311 / 2093402 PCT/JP2007074398.

Primary Examiner — Erick Solis
(74) Attorney, Agent, or Firm — Oblon, Spivak, McClelland, Maier & Neustadt, L.L.P.

(57) ABSTRACT

A valve characteristic controller including an oil pump, a valve timing varying mechanism, and a valve timing control unit is disclosed. The valve timing varying mechanism varies the valve characteristic value of intake valves in an engine based on the hydraulic pressure of hydraulic oil supplied from the oil pump. The valve timing control unit includes a storage and a detector. The storage stores computation maps used to calculate a target value for the valve characteristic value based on a plurality of engine control values. The detector detects the temperature of the hydraulic oil. The computation maps include a first map and a second map. The varying amount of the valve characteristic amount corresponding to a change in the engine control value in a low speed range of the engine speed is set to be smaller in the second map than the first map. The valve timing control unit switches the computation maps from the first map to the second map when the detected temperature of the hydraulic oil is relatively high.

8 Claims, 8 Drawing Sheets

U.S. PATENT DOCUMENTS

| | | | |
|---|---|---|---|
| 6,736,093 B2 * | 5/2004 | Hammer et al. | 123/90.12 |
| 2002/0139333 A1 | 10/2002 | Kusano et al. | |
| 2003/0226533 A1 | 12/2003 | Fujiwara et al. | |

FOREIGN PATENT DOCUMENTS

| | | |
|---|---|---|
| JP | 9 324612 | 12/1997 |
| JP | 10-227235 | 8/1998 |
| JP | 11 93627 | 4/1999 |
| JP | 2000 204982 | 7/2000 |
| JP | 2001 241338 | 9/2001 |
| JP | 2002 38979 | 2/2002 |
| JP | 2003 129875 | 5/2003 |
| JP | 2003 148181 | 5/2003 |
| JP | 2004 92534 | 3/2004 |
| JP | 2005 299547 | 10/2005 |
| JP | 2006 329023 | 12/2006 |

* cited by examiner

VALVE PERFORMANCE CONTROLLER FOR INTERNAL COMBUSTION ENGINE

FIELD OF THE INVENTION

The present invention relates to a valve characteristic controller for an internal combustion engine including a varying mechanism for varying the valve characteristic value of an engine valve based on the hydraulic pressure of hydraulic oil supplied from an engine-driven hydraulic pressure pump.

BACKGROUND OF THE INVENTION

Internal combustion engines installed in recent vehicles often incorporate a valve characteristic varying mechanism for varying a valve characteristic value of intake valves or exhaust valves. For example, patent document 1 describes an internal combustion engine incorporating a valve timing varying mechanism that varies the opening and closing timings of intake valves and exhaust valve, or the so-called valve timing. Referring to FIG. 10, the valve timing varying mechanism 1 includes a pulley 2 and a rotor 4, which is connected to a camshaft 3 so as to be integrally rotatable with the camshaft 3. The pulley 2 and rotor 4 are coupled to be relatively rotatable. The pulley 2 is connected to and driven by an output shaft of the internal combustion engine by a timing belt, which is not shown in the drawings. The pulley 2 is rotated in synchronism with the output shaft. In FIG. 10, an arrow indicates the rotational direction of the pulley 2. A plurality of vanes 5 extend radially outward from the center of the rotor 4. The pulley 2 includes a plurality of cavities 6, each of which retains a corresponding vane 5. As shown in FIG. 10, in each cavity 6, the corresponding vane 5 defines an advancing hydraulic pressure chamber 7, which is located at the side of the vane 5 that is opposite to the rotational direction of the pulley 2, and a retarding hydraulic pressure chamber 8, which is located at the side of the vane 5 that is in the rotational direction of the pulley 2.

In the valve timing varying mechanism 1, the hydraulic pressure of the hydraulic oil supplied to the advancing hydraulic pressure chambers 7 and the retarding hydraulic pressure chambers 8 is adjusted to vary a relative phase a of the rotor 4 and camshaft 3 relative to the pulley 2. As a result, by varying the rotation phase of the camshaft 3 as the output shaft of the internal combustion engine rotates toward the advancing side or the retarding side as indicated by the arrows shown by broken lines, the valve timings of the intake valves or exhaust valves may be varied to timings suitable for the engine operation state. By varying the valve timing in this manner, the engine output and fuel efficiency may be improved.

The valve timing varying mechanism 1 is driven by hydraulic pressure supplied from an engine-driven hydraulic pressure pump, which is driven using the torque of the engine output shaft. Thus, when the engine speed is low, the amount of hydraulic oil pumped out of the hydraulic pressure pump decreases. This lowers the hydraulic pressure supplied to the hydraulic pressure chambers 7 and 8. Further, when the temperature of the hydraulic oil is high, the viscosity of hydraulic oil becomes low and thereby increases the amount of hydraulic oil leaking out from various parts of the engine. This further lowers the hydraulic pressure of the hydraulic oil supplied from the hydraulic pressure pump. As a result, the hydraulic pressure of the hydraulic oil supplied to the valve timing varying mechanism 1 may become insufficient.

In this manner, when the hydraulic pressure of the hydraulic oil becomes insufficient, the responsiveness of the valve timing varying mechanism 1 is lowered, and variations cannot be accurately made in accordance with changes in the target value of the relative phase $\alpha$. This may cause hunting and lower the engine performance, which includes engine output and fuel efficiency.

Such problems caused by insufficient hydraulic pressure of the hydraulic oil may occur not only in valve timing varying mechanisms such as that described above but also in other types of valve characteristic varying mechanisms operated by hydraulic pressure supplied from an engine-driven hydraulic pressure pump.

Patent Document 1: Japanese Laid-Open Patent Publication No. 9-324612

SUMMARY OF THE INVENTION

It is an object of the present invention to provide a valve characteristic controller for an internal combustion engine that suppresses control destabilization factors when controlling valve characteristic values such as hunting that arise if the valve characteristic varying mechanism is driven with insufficient hydraulic pressure of the hydraulic oil.

To achieve the above object, one aspect of the present invention provides a valve characteristic controller for an internal combustion engine including a hydraulic pressure pump, a varying mechanism, and a control unit. The hydraulic pressure pump is driven by the engine. The varying mechanism varies a valve characteristic value of a valve in the engine based on hydraulic pressure of a hydraulic oil supplied from the hydraulic pressure pump. The control unit drives the varying mechanism and controls the valve characteristic value of the valve to be a target value. The control unit includes a storage and a detector. The storage stores computation maps used to calculate the target value for the valve characteristic value based on a plurality of engine control values including an engine speed. The detector detects a temperature of the hydraulic oil. The computation maps include a first map and a second map setting the relationship of the valve characteristic value with respect to an engine control value. A varying amount of the valve characteristic amount corresponding to a change in the engine control value in a low speed range of the engine speed being set to be smaller in the second map than the first map. The control unit switches the computation maps from the first map to the second map when the detected temperature of the hydraulic oil is relatively high.

DETAILED DESCRIPTION OF THE PREFERRED EMBODIMENTS

A first embodiment of a valve characteristic controller for an internal combustion engine according to the present invention applied to a controller for a valve timing varying mechanism will now be discussed with reference to FIGS. 1 to 6.

In the present specification, the term "valve characteristic value" is defined as a concept including the opening timing, closing timing, maximum lift amount, open valve period, and valve overlap period of the intake valves or exhaust valves and a combinations of these parameters.

Figure 1:
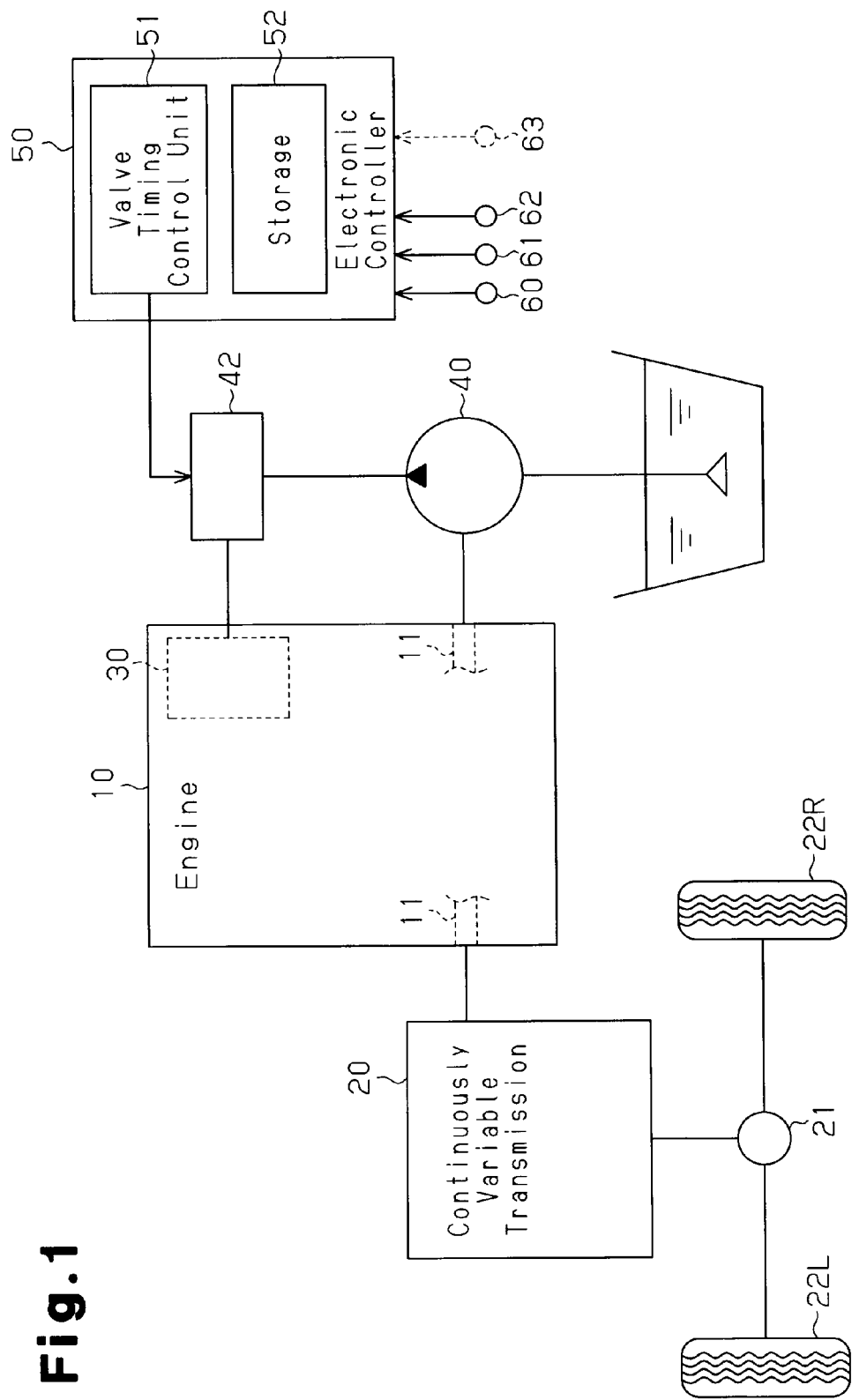
FIG. 1 is a schematic diagram showing the structure of a vehicle incorporating a first embodiment of a controller according to the present invention.

As shown in FIG. 1, an engine 10 includes an output shaft 11 connected to a continuously variable transmission 20. The drive force of the engine 10 is input to the continuously variable transmission 20. The continuously variable transmission 20 has an output side connected to a differential gear 21. The drive force of the engine 10 is transmitted through the continuously variable transmission 20 and the differential gear 21 to left and right wheels 22L and 22R.

Further, the engine 10 includes a valve timing varying mechanism 30 for varying the valve timing of intake valves, which are not shown in the drawings. The valve timing varying mechanism 30 is connected to the output shaft 11 of the engine 10 and supplied with hydraulic oil from an engine-driven oil pump 40, which is driven by the torque of the output shaft.

In cooperation with the rotation of the output shaft 11, the oil pump 40 supplies hydraulic oil, which is contained in an oil pan 41, to the valve timing varying mechanism 30. The oil pump 40 also supplies hydraulic oil to moving parts of the engine 10 for lubrication. The valve timing varying mechanism 30 varies the valve timing of the intake valves based on the hydraulic pressure of the hydraulic oil supplied from the oil pump 40. The hydraulic pressure supplied to the valve timing varying mechanism 30 is controlled by an oil control valve 42, which is arranged between the valve timing varying mechanism 30 and the oil pump 40. The oil control valve 42 is operated by a control signal from an electronic controller 50.

The electronic controller 50 includes a control unit 51 and a storage 52. The control unit 51 performs various computations based on detection values of various sensors, which will be described later. The storage 52 stores computation maps referred to when the control unit 51 performs various computations and various computations programs.

As the various sensors described above, the electronic controller 50 is connected to, for example, a coolant temperature sensor 60, for detecting the engine coolant temperature THW, a crank position sensor 61 for detecting the engine speed NE, and an airflow meter 62 for detecting the intake air amount GA of the engine 10. The electronic controller 50 retrieves the detection values of the various sensors 60 to 62 and controls the hydraulic oil supplied to and discharged from the valve timing varying mechanism 30 with the oil control valve 32 so as to realize the valve timing suitable for the engine operation state.

The structure of the valve timing varying mechanism 30 will now be discussed in detail with reference to FIG. 2.

Figure 2:
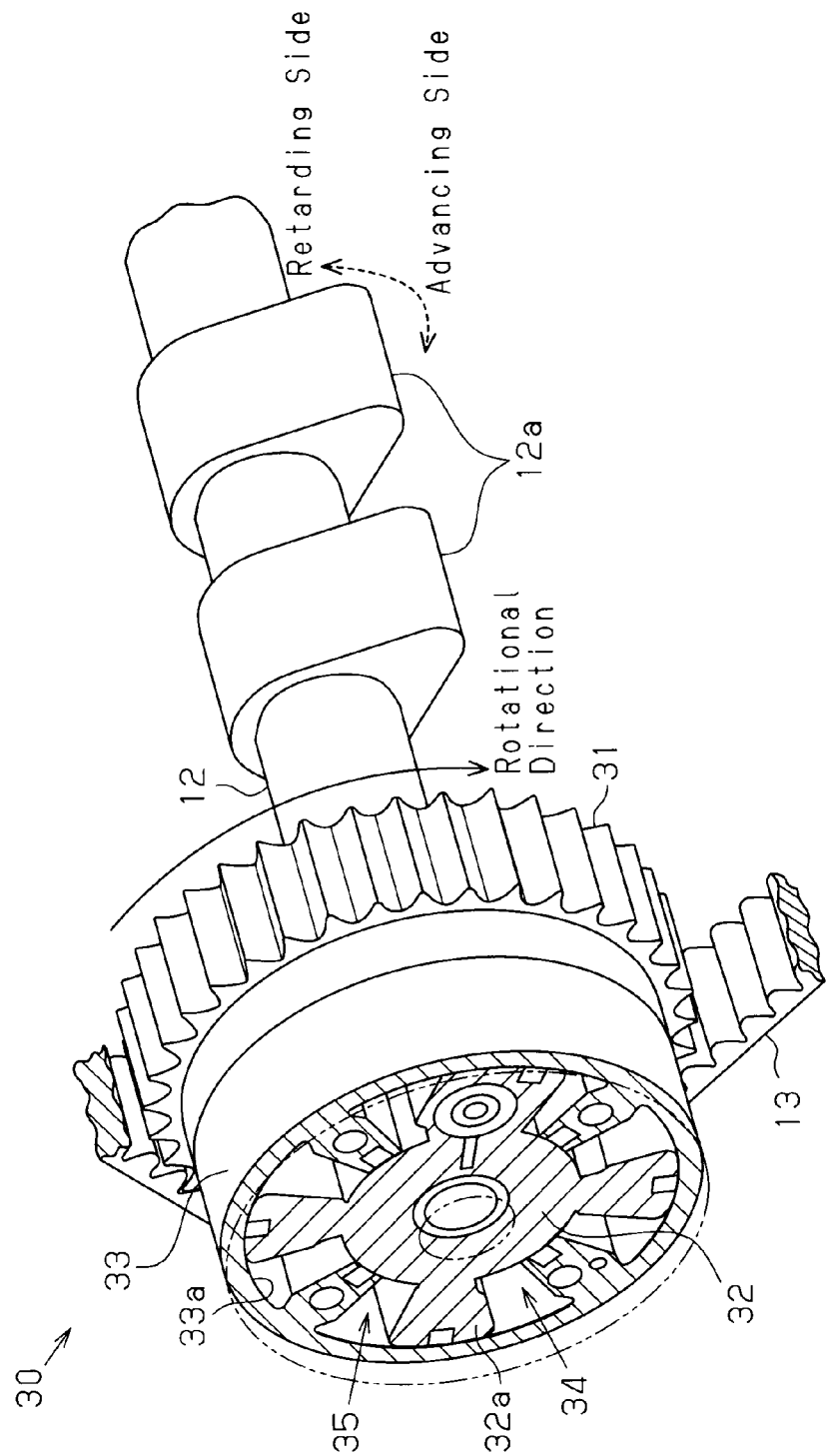
FIG. 2 is a partially cross-sectional perspective view of a valve timing varying mechanism shown in FIG. 1.

As shown in FIG. 2, the valve timing varying mechanism 30 is arranged on one end of an intake camshaft 12, which includes intake cams 12a for opening and closing the intake valves.

The valve timing varying mechanism 30 includes a pulley 31 and a rotor 32, which is connected to the intake camshaft 12 so as to be integrally rotatable with the camshaft 12. The pulley 31 and rotor 32 are coupled to be relatively rotatable. The pulley 31 is connected to and driven by the output shaft 11 of the engine 10 by a timing belt 13. The pulley 31 is rotated in synchronism with the output shaft 11. In FIG. 2, an arrow indicates the rotational direction of the pulley 31.

The pulley 31 includes a cylindrical housing 33, which houses the rotor 32. A plurality of (four in FIG. 2) vanes 32a extend radially outward from the periphery of the rotor 32. The housing 33 includes a plurality of cavities 33a, each of which retains a corresponding vane 32a. As shown in FIG. 2, in each cavity 33a, the corresponding vane 32a defines an advancing hydraulic pressure chamber 34, which is located at the side of the vane 32a that is opposite to the rotational direction of the pulley 31, and a retarding hydraulic pressure chamber 35, which is located at the side of the vane 32a that is in the rotational direction of the pulley 31.

In the valve timing varying mechanism 30, the hydraulic pressure in the advancing hydraulic pressure chamber 34 and the retarding hydraulic pressure chamber 35 is controlled with the oil control valve 42 to vary the valve timings of the intake valves.

Specifically, the hydraulic pressure in the advancing hydraulic pressure chamber 34 is increased and the hydraulic pressure in the retarding hydraulic pressure chamber 35 is decreased to rotate the rotor 32 relative to the pulley 31 in the same direction as the rotational direction of the pulley 31. As a result, the intake camshaft 12 connected to the rotor 32 rotates toward the advancing side as indicated by the arrow shown by broken lines in FIG. 2, and the phase of the intake cams 12a relative to the rotation phase of the output shaft 11 is varied so as to advance the valve timing.

When increasing the hydraulic pressure in the retarding hydraulic pressure chamber 35 and decreasing the hydraulic pressure in the advancing hydraulic pressure chamber 34, the rotor 32 rotates relative to the pulley 31 in a direction opposite the rotational direction of the pulley 31. As a result, the intake camshaft 12 rotates toward the retarding side as indicated by the arrow shown by broken lines in FIG. 2, and the phase of the intake cams 12a relative to the rotation phase of the output shaft 11 is varied so as to retard the valve timing.

When the volume of the advancing hydraulic pressure chamber 34 is in a minimum state, that is, when the intake camshaft 12 is located at a most retarded position, the opening and closing timings of each valve is set so that there is no overlap period of the intake valve and exhaust valve.

The retarding amount of the intake valves is adjusted in accordance with the engine operation state to vary the valve opening and valve closing timings and the overlap period of the intake valve and exhaust valve.

Specifically, when the engine is started or when the engine is in a low speed, low road range such as when in idle, the overlap period of the intake valve and exhaust valve is eliminated, and the amount of exhaust gas that returns to the intake port and the cylinder is suppressed to stabilize combustion. When the engine is in an intermediate load range such as when the vehicle starts to move and accelerates, the intake camshaft 12 is retarded to increase the overlap period, reduce pumping loss, increase the internal EGR rate, and reduce emissions.

Figure 3:
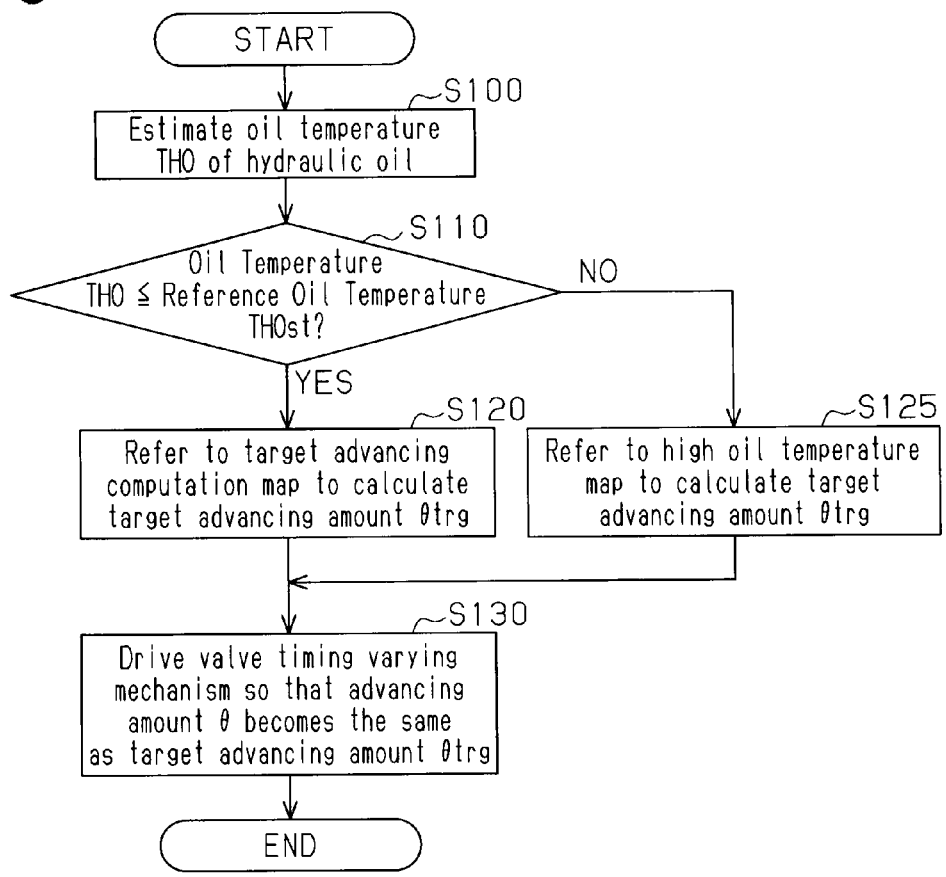
FIG. 3 is a flowchart showing the procedures for processing valve timing control in the first embodiment.

The procedures for performing processing to vary the valve timing will now be discussed with reference to FIG. 3. The process shown in FIG. 3 is repeated in predetermined cycles by the control unit 51 of the electronic controller 50 when the engine is running.

First, in step S100, the oil temperature THO of the hydraulic oil is estimated. The oil temperature THO is estimated based on the engine coolant temperature THW detected by the coolant temperature sensor 60 and the cumulative value $\Sigma GA$ of the intake air amount GA detected by the airflow meter 62 in the most recent predetermined period.

Figure 4:
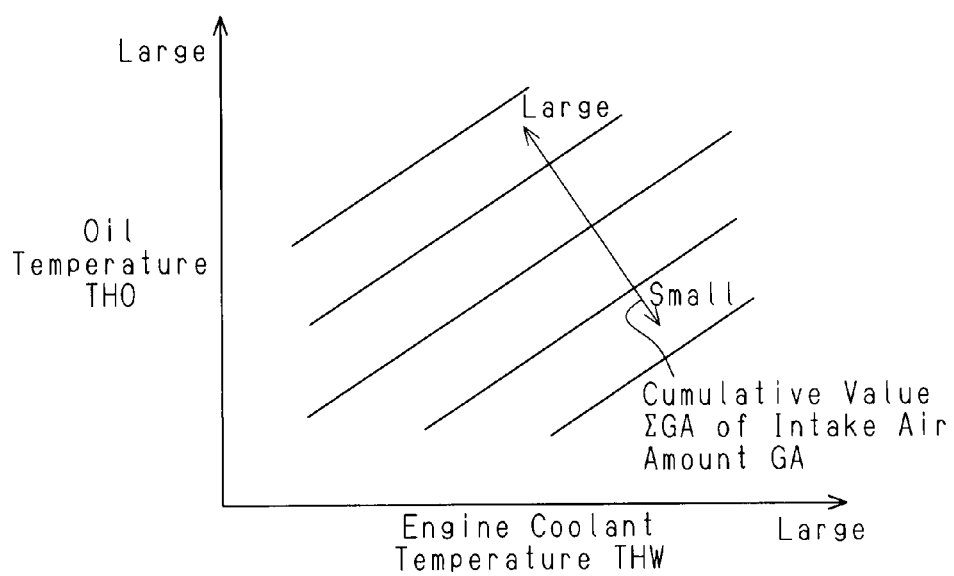
FIG. 4 is a graph showing the relationship of the cumulative value of the intake air amount, the engine coolant temperature, and the oil temperature.

Specifically, the storage 52 of the electronic controller 50 stores a computation map such as that shown in FIG. 4. The oil temperature THO is estimated by referring to the computation map. The map is set based on the results of experiments or the like conducted beforehand so that the value of the estimated oil temperature THO increases as the engine coolant temperature THW increases and so that the value of the estimated oil temperature THO increases as the value of the cumulative value $\Sigma GA$ of the intake air amount GA increases.

When the oil temperature THO is estimated in step S100, the control unit 51 proceeds to step S110 and compares the estimated oil temperature THO with a reference oil temperature THOst to determine whether or not the oil temperature THO is less than or equal to the reference oil temperature THOst.

The reference oil temperature THOst is an oil temperature for determining whether or not the hydraulic pressure supplied to the valve timing varying mechanism 30 has a tendency of becoming insufficient due to a decrease in viscosity resulting from an increase in the oil temperature THO of the hydraulic oil. The reference oil temperature THOst is determined based on the results of experiments or the like conducted beforehand.

When determined in step S110 that the estimated oil temperature THO is less than or equal to the reference oil temperature THOst, that is, when determined that sufficient hydraulic pressure is supplied to the valve timing varying mechanism 30, the control unit 51 proceeds to step S120 and refers to a first map (target advancing amount computation map) to calculate the target advancing amount $\theta$trg. In the target advancing amount computation map, the target advancing amount $\theta$trg of the intake valves suitable for the engine operations state, which is estimated from the engine speed Ne and the load rate KL, is set based on the results of experiments or the like conducted beforehand. The target advancing amount computation map is stored in the storage 52 of the electronic controller 50. The load rate KL of the engine 10 is the ratio of the present load relative to the entire load and calculated from the intake air amount GA in a single intake stroke.

Figure 5:
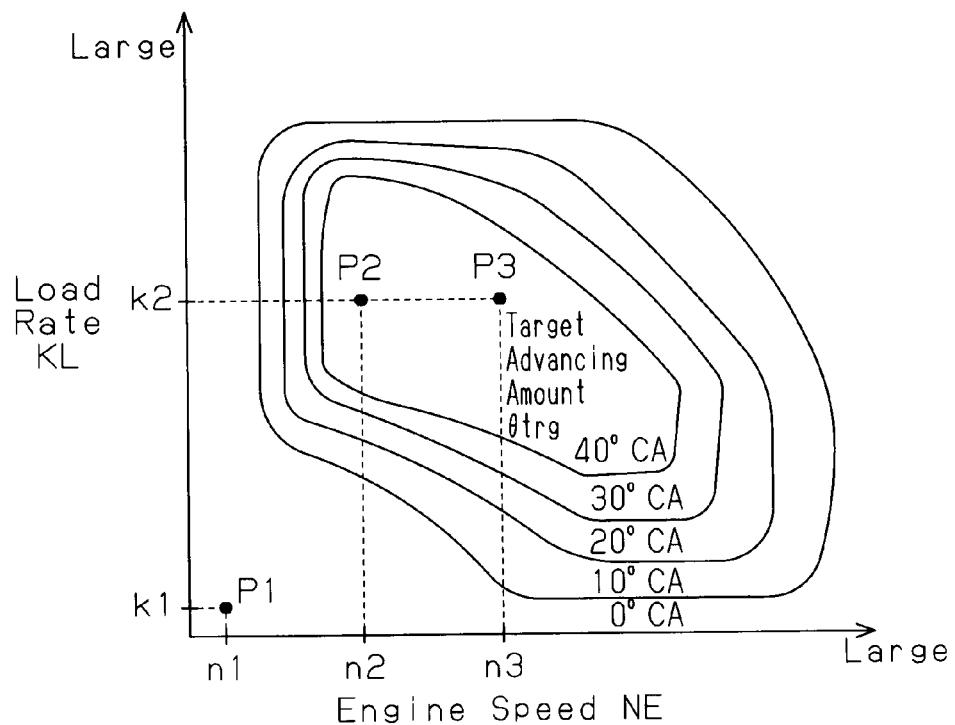
FIG. 5 is a map for obtaining a target advancing amount of the intake valves from the engine speed and load rate.

In step S120, the target advancing amount $\theta$trg is calculated by referring to the target advancing angle computation map shown in FIG. 5. For example, in a low speed, low load state (point P1: engine speed NE=n1, load rate KL=k1) such as when the engine is in idle, the target advancing amount $\theta$trg of "0° CA" is calculated to eliminate the valve overlap period as described above. When the engine is in an intermediate load state (point P2: engine speed NE=n2, load rate KL=k2) (point P3: engine speed NE=n3, load rate KL=k2) such as when the vehicle starts to move and accelerates, the target advancing amount $\theta$trg of "40° CA" is calculated to increase the valve overlap period as described above.

When the target advancing amount $\theta$trg is calculated in step S120, the control unit 51 proceeds to step S130 and drives the valve timing varying mechanism 30 with the oil control valve 42 so that the actual advancing amount $\theta$ becomes the same as the target advancing amount $\theta$trg.

In step S130, when the deviation of the actual advancing amount $\theta$ and the target advancing amount $\theta$trg becomes less than or equal to a predetermined amount, the processing is temporarily terminated.

Figure 6:
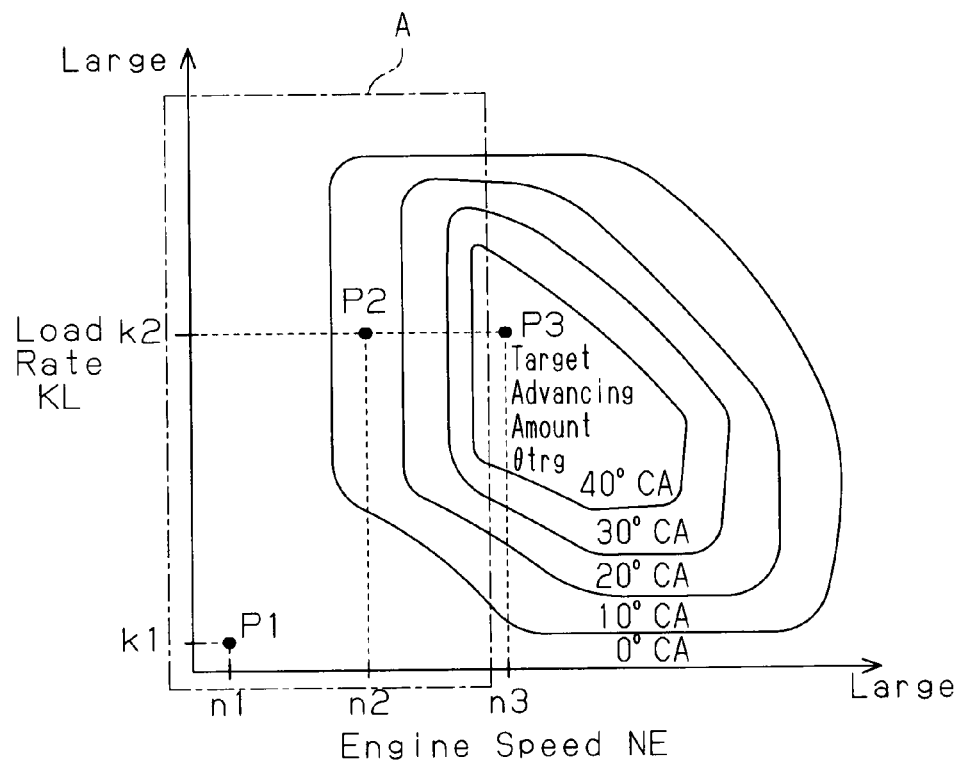
FIG. 6 is a map for obtaining the target advancing amount of the intake valves from the engine speed and load rate when the oil temperature is high.

When determined in step S110 that the estimated oil temperature THO is greater than the reference oil temperature THOst, that is, when determined that insufficient hydraulic pressure is supplied to the valve timing varying mechanism 30, the control unit 51 proceeds to step S125 and refers to a second map (high oil temperature map), which is shown in FIG. 6, instead of the target advancing amount computation map to calculate the target advancing amount $\theta$trg.

The high oil temperature map is used to calculate the target advancing amount $\theta$trg based on the engine speed Ne and the load rate KL in the same manner as the target advancing amount computation map shown in FIG. 5. However, the characteristics of the high oil temperature map are set so that the target advancing amount $\theta$trg in the low speed range is less in comparison with the target advancing amount computation map. The high oil temperature map is stored in the storage 52 of the electronic controller 50 in the same manner as the target advancing amount computation map.

Specifically, in a low speed, low load state (point P1: engine speed NE=n1, load rate KL=k1) such as when the engine is in idle, the target advancing amount $\theta$trg of "0° CA" is calculated by referring to the high oil temperature map shown in FIG. 6 in the same manner as the target advancing amount computation map shown in FIG. 5 and referred to in step S120. When the engine is in an intermediate load, low speed state (point P2: engine speed NE=n2, load rate KL=k2) such as when the vehicle starts to move and accelerates, the target advancing amount $\theta$trg of "10° CA," which is less than "40° CA," is calculated by referring to the target advancing amount computation map shown in FIG. 5 in step S120. Further, when the engine is in an intermediate load range but the engine speed NE is high (point P3: engine speed NE=n3, load rate KL=k2), the target advancing amount $\theta$trg of "40° CA" is calculated in the same manner as when referring to the target advancing amount computation map in step S120.

When the target advancing amount $\theta$trg is calculated in step S125, the control unit 51 proceeds to step S130 and drives the valve timing varying mechanism 30 with the oil control valve 42 so that the actual advancing amount $\theta$ becomes the same as the target advancing amount $\theta$trg. In step S130, when the deviation of the actual advancing amount $\theta$ and the target advancing amount $\theta$trg becomes less than or equal to a predetermined amount, the processing is temporarily terminated.

The above described series of processes (step S100 to step S130) is repeated in predetermined cycles to vary the valve timing of the intake valves while switching the computation map referred to when setting the target advancing amount $\theta$trg based on the oil temperature THO of the hydraulic oil.

This embodiment has the advantages described below.

(1) A state in which the hydraulic pressure supplied to the valve timing varying mechanism 30 has a tendency of becoming insufficient is determined based on whether the oil temperature THO of the hydraulic oil is higher than the reference oil temperature THOst. In such a case, the computation map is switched to the high oil temperature map, the characteristics of which are set so that the target advancing amount $\theta$trg in the low speed range is less in comparison with the normal target advancing amount computation map. Accordingly, when the engine speed NE is in a low speed range and a sufficient amount of hydraulic oil is not pumped out of the oil pump 40, the varying amount of the valve timing varying mechanism 30 is restricted. This suppresses control destabilization factors when controlling the valve timing such as hunting that arise if the valve timing varying mechanism 30 is driven with insufficient hydraulic pressure of the hydraulic oil.

(2) In the first embodiment, to estimate the oil temperature THO of the hydraulic oil, the control unit 51, which functions as an oil temperature detector, uses the coolant temperature THW and the cumulative value ΣGA of the intake air amount GA in the most recent predetermined period as correlation values for the temperature of the hydraulic oil. The engine coolant temperature THW changes with a high correlation with the average temperature of the entire engine 10, while the cumulative value ΣGA of the intake air amount GA has a tendency of changing with a high correlation with local temperature changes in the vicinity of combustion chambers. Thus, by referring to both the cumulative value ΣGA of the intake air amount GA and the engine coolant temperature THW, the hydraulic oil temperature may be estimated further accurately.

(3) In a vehicle that uses a continuously variable transmission 20, the engine speed NE is maintained near a target engine speed at which the fuel consumption rate is ideal. As a result, the low speed range is the most often used engine operation range. Further, as the hydraulic oil deteriorates over time and its viscosity decreases, the amount of hydraulic oil that leaks out of parts supplied with the hydraulic oil may increase. In this manner, when the low speed state is often used and the leakage amount of the hydraulic oil is increased, if the engine operation state is maintained in a low load operation state for a long period of time, the hydraulic pressure of the hydraulic oil supplied to the valve timing varying mechanism 30 may become less than the hydraulic pressure required to properly operate the valve timing varying mechanism 30. If the hydraulic pressure of the hydraulic oil becomes insufficient in this manner, the operation responsiveness of the valve timing varying mechanism 30 may decrease, and hunting may occur. As a result, the engine operation state may become unstable, the drivability may decrease, and the engine performance including the engine output and fuel efficiency may decrease. In the above described embodiment, the valve timing is varied by referring to the high oil temperature map in which the target advancing amount θtrg in the low speed range is set to be small. This prevents the above problems from occurring.

In the processing for varying the valve timing (step S100 to step S130), before the process of step S100 for estimating the oil temperature THO of the hydraulic oil, a process for determining from the engine speed NE whether or not the hydraulic pressure supplied to the valve timing varying mechanism 30 is insufficient may be added. In a structure including this process, when the engine speed NE is in the low speed range and the oil temperature THO of the hydraulic oil is relatively high, the computation map is switched from the normal target advancing amount computation map to the high oil temperature map.

Figure 7:
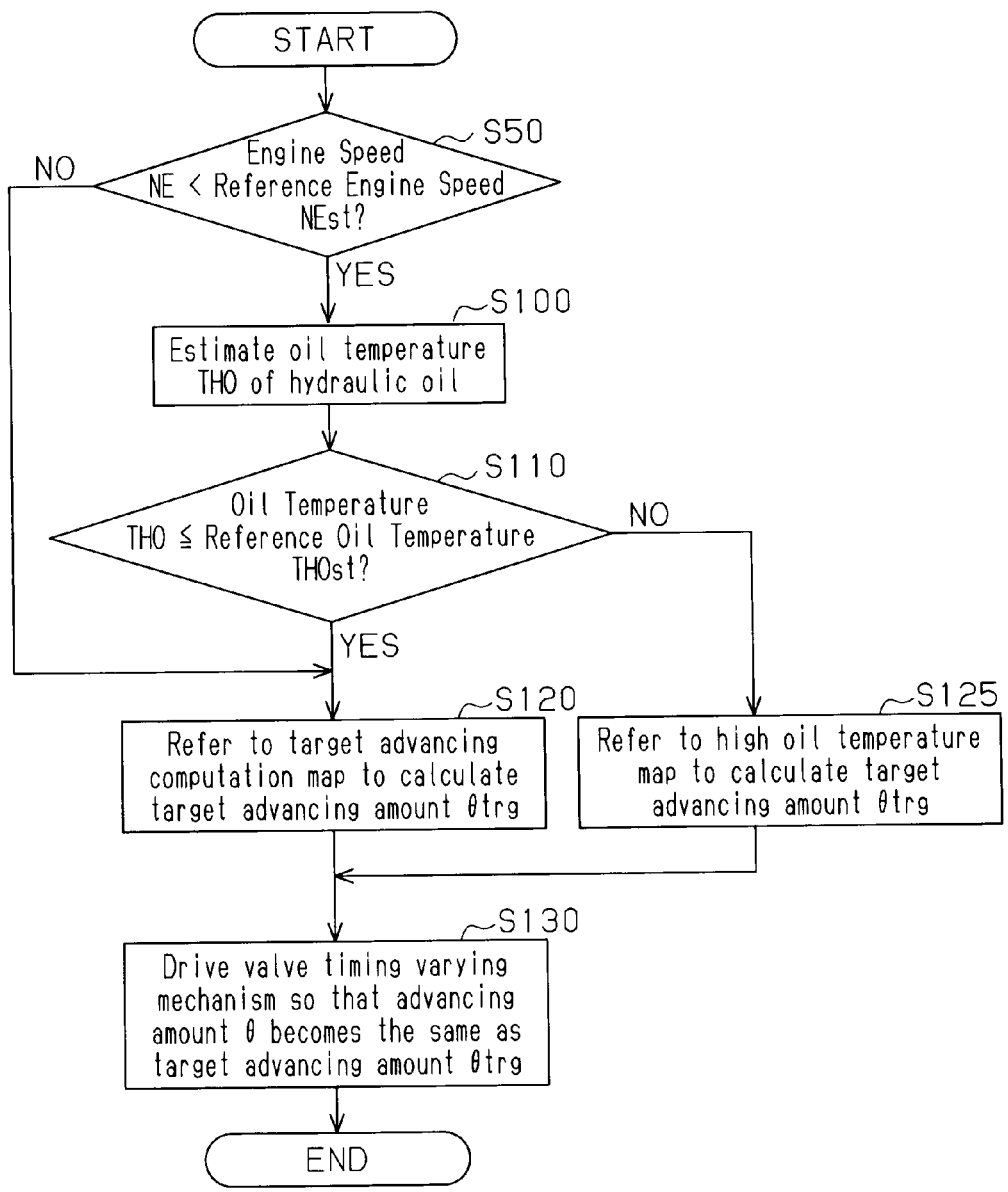
FIG. 7 is a flowchart showing the procedures for processing valve timing control in a modification of the first embodiment.

Specifically, in the processing for varying the valve timing that is shown in FIG. 7, first, in step S50, it is determined whether or not the engine speed NE is less than a reference engine speed NEst. The reference engine speed NEst is the engine speed that ensures sufficient hydraulic pressure even if the oil temperature THO of the hydraulic oil becomes high and the viscosity becomes low. The reference engine speed NEst is set based on the results of experiments or the like conducted beforehand taking into consideration the pumping capacity of the oil pump 40.

When determined in step S50 that the engine speed NE is greater than or equal to the reference engine speed NEst in step S50, that is, when determined that the supplied hydraulic pressure is sufficient even though the oil temperature THO is high, the control unit 51 skips the processes of steps S100 and S110 and proceeds to step S120. In the same manner as in the first embodiment, in step S120 and step S130, the target advancing amount θtrg is calculated, and the valve timing varying mechanism 30 is driven.

When determined in step S50 that the engine speed NE is less than the reference engine speed NEst in step S50, that is, when determined that the engine speed NE is low and the supplied hydraulic pressure is insufficient if the oil temperature THO is high, the control unit 51 proceeds to step S100. Then, through step S100 to step S130, the valve timing varying mechanism 30 is driven while switching the computation map that is used when calculating the target advancing amount θtrg based on the oil temperature THO in the same manner as in the first embodiment.

In such a structure, when sufficient hydraulic pressure for operating the valve timing varying mechanism 30 cannot be ensured due to the engine speed NE being in the low speed range and the oil temperature TH of the hydraulic oil being relatively high, the computation map is switched from the normal target advancing amount computation map when setting the target advancing amount θtrg. Accordingly, in the same manner as in the first embodiment, if the supplied hydraulic pressure is insufficient, the varying amount is restricted when driving the valve timing varying mechanism 30 and varying the valve timing. This suppresses control destabilization factors when controlling the valve timing such as hunting that arise if the valve timing varying mechanism 30 is driven with insufficient hydraulic pressure of the hydraulic oil.

Further, in such a structure, the computation map is switched to the high oil temperature map only when determined in step S50 that the engine speed NE is less than the reference engine speed NEst and determined in step S110 that the oil temperature THO is greater than the reference oil temperature THOst. Thus, the high oil temperature map only needs to allow calculation of the target advancing amount θtrg in the low speed range as shown in FIG. 6 by portion A, which is surrounded by the single-dashed line. This allows the storage capacity to be reduced for storing the computation maps.

A second embodiment will now be discussed with reference to FIGS. 8 and 9. In the first embodiment, when the oil temperature THO of the hydraulic oil is high, by switching to the high oil temperature map in which the target advancing amount θtrg is set so that the varying amount of the valve timing is decreased in the low speed range, the varying of the valve timing is suppressed when the supplied hydraulic pressure is insufficient. In this embodiment, the varying amount of the valve timing is restricted by setting an advancing amount guard value θgrd for the target advancing amount θtrg based on the oil temperature THO of the hydraulic oil.

Hereafter, points that are the same as the first embodiment will not be described. The discussion will center on the points differing between the two embodiments, particularly, the flow of the processing for varying the valve timing.

Figure 8:
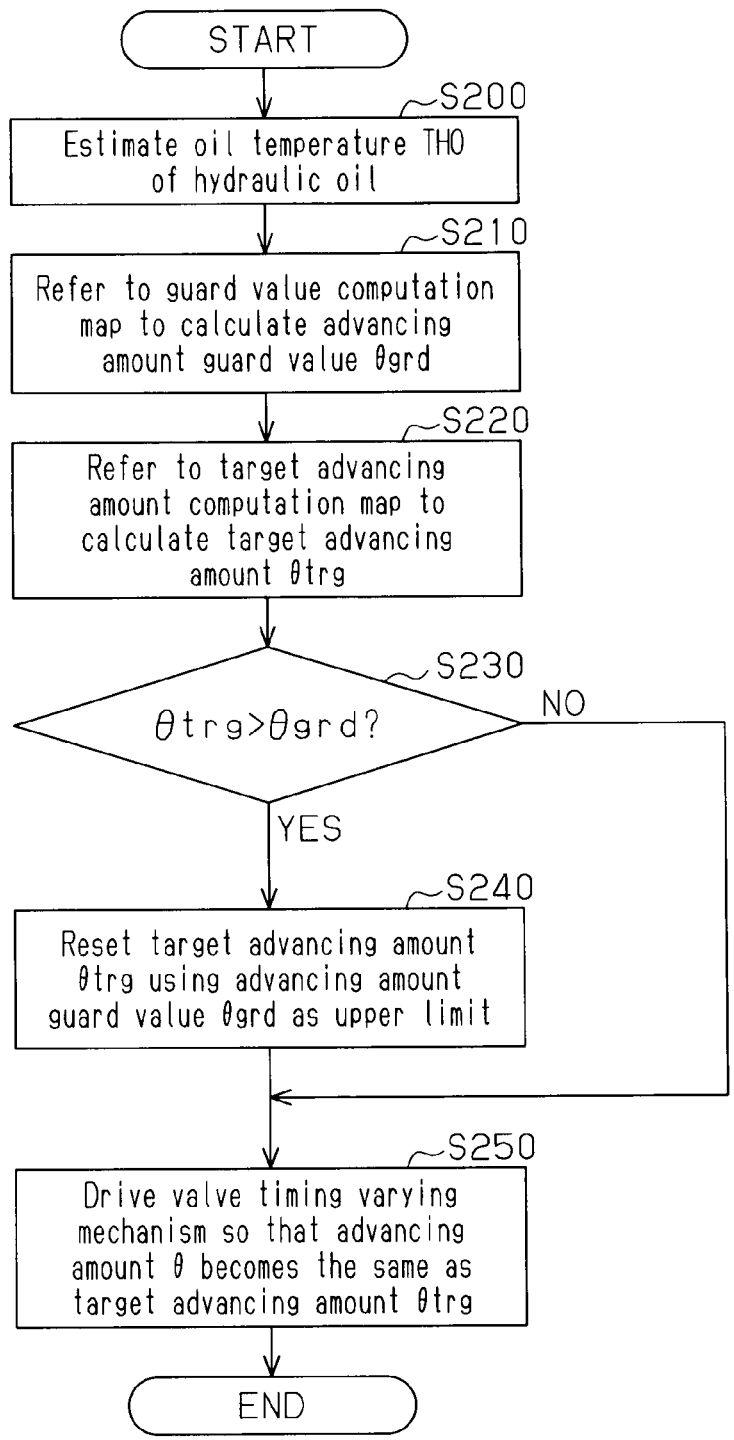
FIG. 8 is a flowchart showing the procedures for processing valve timing control in a second embodiment.
Figure 9:
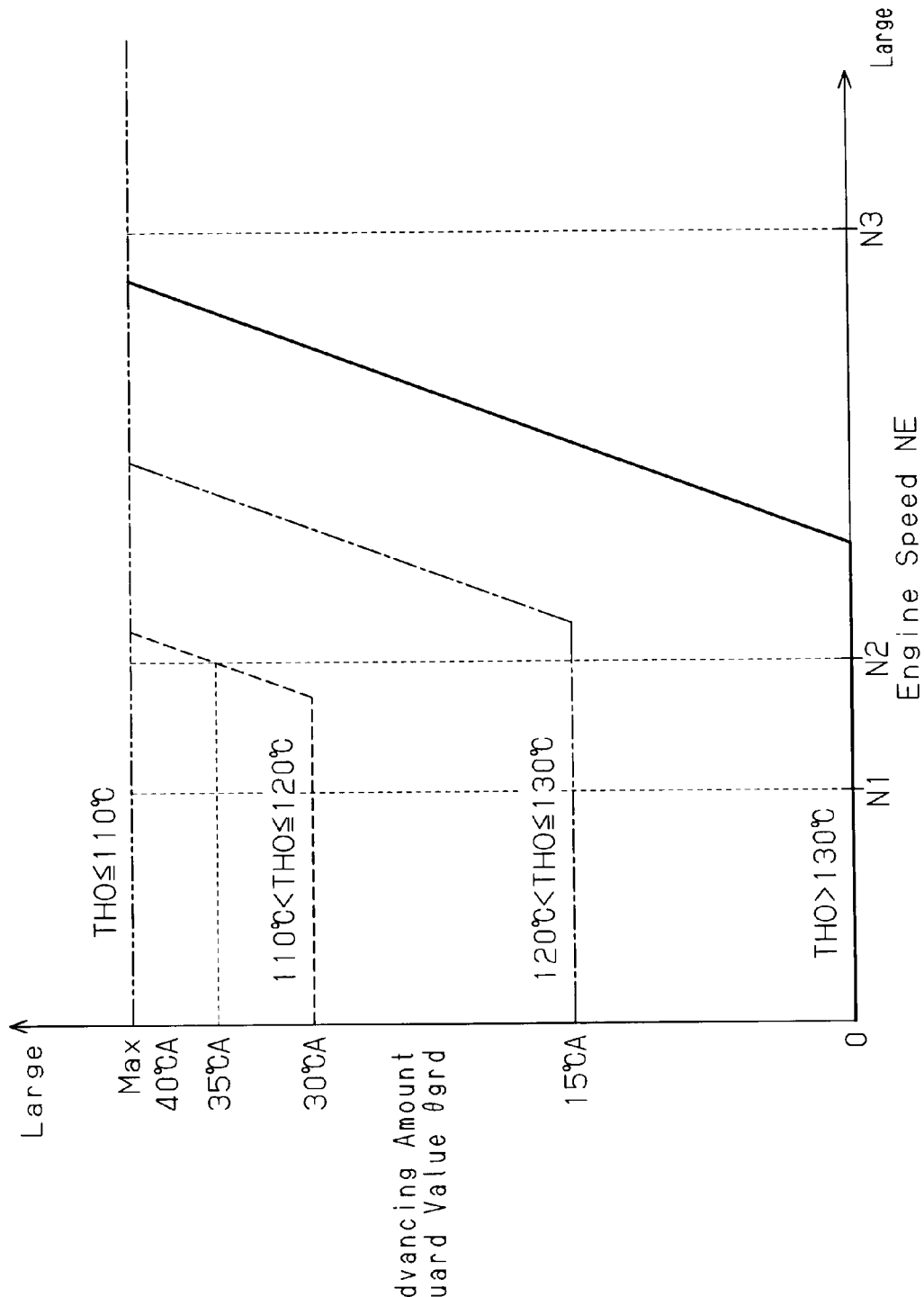
FIG. 9 is a map for obtaining an advancing amount guard value from the engine speed and the oil temperature of the hydraulic oil.
Figure 10:
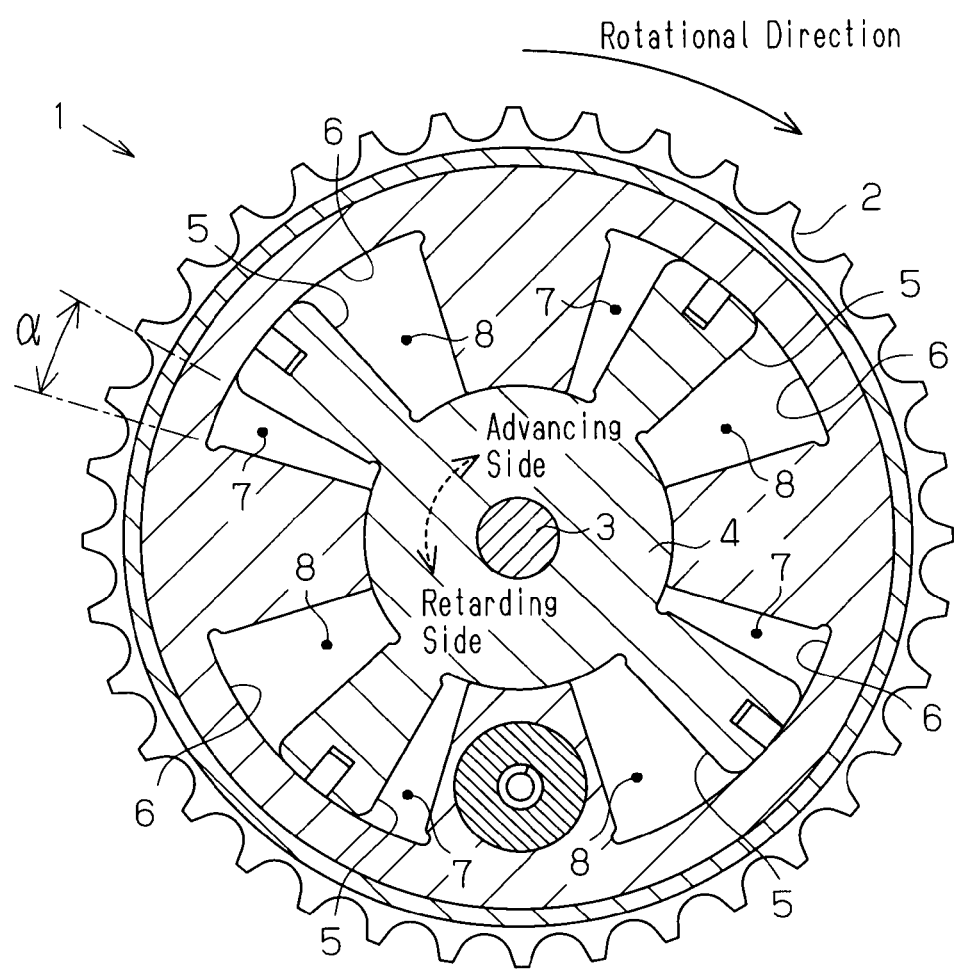
FIG. 10 is a cross-sectional diagram showing the structure of a valve timing varying mechanism in the prior art.

FIG. 8 is a flowchart showing the processing for varying the valve timing in this embodiment. In the same manner as in the first embodiment, this processing is repeated by the control unit 51 of the electronic controller 50 when the engine is running.

When the series of processes starts, as shown in FIG. 8, first, in step S200, the oil temperature THO is estimated. Estimation of the oil temperature THO is performed in the same manner as in step S100 of the first embodiment by referring to the computation map shown in FIG. 4 and stored in the storage 52 of the electronic controller 50.

When the oil temperature THO is estimated in step S200, the control unit 51 proceeds to step S210 and refers to a guard value computation map to calculate the advancing amount guard value θ. The guard value computation map is set as shown in FIG. 9 so that the advancing amount guard value θgrd decrease as the engine speed NE decreases and the oil temperature THO of the hydraulic oil increases. The guard value computation map is also stored in the storage 52 of the electronic controller 50 in the same manner as the other computation maps.

For example, when the oil temperature THO is 110° C. or less, at which the amount of hydraulic oil that leaks out of the various moving parts of the engine 10 is relatively small, the advancing amount guard value θgrd is set to "40° CA," which is the maximum advancing angle of the valve timing varying mechanism 30, when the engine speed NE is any one of N1, N2, and N3 (N1<N2<N3) by referring to the guard value computation map. Thus, in this case, the advancing amount is substantially not restricted.

When the oil temperature THO is greater than 110° C. but less than or equal to 120° C., the advancing amount guard value θgrd is set to "30° CA" if the engine speed is N1, and the advancing amount guard value θgrd is set to "35° CA" if the engine speed is N2. When the oil temperature THO is greater than 120° C. but less than or equal to 130°, the advancing amount guard value θgrd is set to "15° CA" if the engine speed is N1 or N2. When the oil temperature THO is greater than 130° C., the advancing amount guard value θgrd is set to "0° CA" if the engine speed is N1 or N2.

When the advancing amount guard value θgrd is calculated in this manner, the control unit 51 proceeds to step S220 and refers to the target advancing amount computation map shown in FIG. 5 to calculate the target advancing amount θtrg in the same manner as in the first embodiment.

When the target advancing amount θtrg is calculated in step S220, the control unit 51 proceeds to step 230 and determines whether or not the target advancing amount θtrg is greater than the advancing amount guard value θgrd. When determined that the target advancing amount θtrg is greater than the advancing amount guard value θgrd in step S230, the control unit 51 proceeds to step S240 and resets the calculated target advancing amount θtrg using advancing amount guard value θgrd as upper limit. When determined that the target advancing amount θtrg is less than or equal to the advancing amount guard value θgrd in step S230, the control unit 51 skips step S240 and proceeds to step S250. In this manner, when the target advancing amount θtrg is set through steps S220 to S240, the control unit 51 proceeds to step S250 and drives the valve timing varying mechanism 30 so that the actual advancing amount θ becomes the same as the target advancing amount θtrg.

In step S250, when the valve timing varying mechanism 30 is driven and the deviation of the actual advancing amount θ and the target advancing amount θtrg becomes less than or equal to a predetermined amount, the processing is temporarily terminated.

The above described series of processes (step S200 to step S250) is repeated in predetermined cycles to vary the valve timing of the intake valves.

The second embodiment has the advantages described below in addition to advantages (2) and (3) of the first embodiment.

(4) The advancing amount guard value θgrd is set. Further, the target advancing amount θtrg is restricted when the engine speed NE is in a low speed range and the oil temperature THO of the hydraulic oil is high. Thus, the varying amount of the valve timing is restricted. This suppresses control destabilization factors when controlling the valve timing such as hunting that arise if the valve timing varying mechanism 30 is driven with insufficient hydraulic pressure of the hydraulic oil.

(5) Additionally, the advancing amount guard value θgrd is set to a smaller value as the oil temperature THO increases. This sets the target advancing amount θtrg in accordance with the amount of hydraulic oil that leaks out of parts supplied with the hydraulic oil as the viscosity of the hydraulic oil decreases, that is, in accordance with the insufficient degree of the hydraulic pressure of the hydraulic oil in the valve timing varying mechanism 30. This suppresses control destabilization factors when controlling the valve timing in a further preferable manner.

(6) Further, the advancing amount guard value θgrd is set to a smaller value as the engine speed NE decreases. This sets the target advancing amount θtrg in accordance with the amount of hydraulic oil pumped out of the oil pump 40, that is, in accordance with the insufficient degree of the hydraulic pressure of the hydraulic oil in the valve timing varying mechanism 30. This suppresses control destabilization factors when controlling the valve timing in a further preferable manner.

The second embodiment may be modified as described below.

In the illustrated structure, the advancing amount guard value θgrd is set based on the engine speed NE and the oil temperature THO of the hydraulic oil. Further, the advancing amount guard value θgrd is set to be a smaller value as the engine speed NE decreases and the oil temperature THO of the hydraulic oil increases. However, the present invention is not limited to such a structure. More specifically, the varying amount of the valve timing may be restricted when the engine speed NE is in the low speed range and the oil temperature THO of the hydraulic oil is high. For example, when the engine speed NE is less than a certain engine speed, the advancing amount guard value θgrd may be set to be smaller as the oil temperature THO of the hydraulic oil increases. Alternatively, when the oil temperature THO of the hydraulic oil is greater than or equal to a certain oil temperature, the advancing amount guard value θgrd may be set to be smaller as the engine speed NE increases.

The first and second embodiments may be modified as described below.

In each of the above embodiments, the oil temperature THO of the hydraulic oil is estimated based on the engine coolant temperature THW detected by the coolant temperature sensor 60 and the cumulative value ΣGA of the intake air amount GA detected by the airflow meter 62 in the most recent predetermined period. Alternatively, instead of the cumulative value ΣGA of the intake air amount GA, the oil temperature THO may be calculated by using an engine control amount that varies with a high correlation with the cumulative value ΣGA of the intake air amount GA, such as a cumulative value of the fuel injection amount.

An oil temperature sensor 63, which directly detects the oil temperature THO as shown by the broken lines in FIG. 1, may be used as an oil temperature detector.

Each of the above embodiments are examples in which the present embodiment is embodied in the valve timing varying mechanism 30, which varies the valve timing of the intake valves. However, the present invention is not limited in such a manner. More specifically, the present invention may be applied to a structure in which the intake side and exhaust side are both provided with a valve timing varying mechanism to vary the valve timings of the intake valves and the exhaust valves. Alternatively, the present invention may be applied to a structure in which the exhaust side is provided with a valve timing varying mechanism to vary the valve timing of the exhaust valves.

When employing a structure in which a restriction difference in the varying amount is provided for the valve timing varying mechanisms of the intake side and exhaust side, it is desirable that the restriction in the varying amount of the exhaust valve timing varying mechanism be greater than that for the intake side.

In each of the above embodiments, the valve timing varying mechanism 30, which varies the valve timing to a timing that is suitable for the engine operation state, is illustrated as one example of a varying mechanism for varying a valve characteristic value of an engine valve. The varying mechanism subject to a valve characteristic controller for an internal combustion engine according to the present invention is not limited to such a structure and may be a varying mechanism that varies a valve characteristic using the supplied hydraulic pressure of hydraulic oil, which is supplied from an engine-driven oil pump. That is, the varying mechanism may vary parameters such as the valve closing timing, valve opening timing, open valve period, maximum lift amount, and valve overlap period of the intake valves and exhaust valves. Alternatively, the varying mechanism may vary a combination of these parameters, such as the valve closing timing and valve opening timing, and the valve open period and maximum lift amount.

The invention claimed is:

1. A valve characteristic controller for an internal combustion engine, the controller comprising:
   a hydraulic pressure pump driven by the engine;
   a varying mechanism which varies a valve characteristic value of a valve in the engine based on hydraulic pressure of a hydraulic oil supplied from the hydraulic pressure pump; and
   a control unit which drives the varying mechanism and controls the valve characteristic value of the valve to be a target value, in which the control unit includes:
      a storage which stores computation maps used to calculate the target value for the valve characteristic value based on a plurality of engine control values including an engine speed; and
      a detector which detects a temperature of the hydraulic oil;
      wherein the computation maps include a first map and a second map setting the relationship of the valve characteristic value with respect to an engine control value, with a varying amount of the valve characteristic amount corresponding to a change in the engine control value in a low speed range of the engine speed being set to be smaller in the second map than the first map; and
      the control unit switches the computation maps from the first map to the second map when the detected temperature of the hydraulic oil is relatively high.

2. The controller according to claim 1, wherein the detector estimates the temperature of the hydraulic oil based on at least either one of an engine coolant temperature and a cumulative value of an intake air amount in a most recent predetermined period.

3. The controller according to claim 1, wherein the internal combustion engine transmits drive force to a vehicle drive system with a continuously variable transmission which continuously varies a gear ratio.

4. The controller according to claim 2, wherein the internal combustion engine transmits drive force to a vehicle drive system with a continuously variable transmission which continuously varies a gear ratio.

5. A valve characteristic controller for an internal combustion engine, the controller comprising:
   a hydraulic pressure pump driven by the engine;
   a varying mechanism which varies a valve characteristic value of a valve in the engine based on hydraulic pressure of a hydraulic oil supplied from the hydraulic pressure pump; and
   a control unit which drives the varying mechanism and controls the valve characteristic value to be a target value, in which the control unit includes:
      a storage which stores computation maps used to calculate the target value for the valve characteristic value based on an engine control value; and
      a detector which detects a temperature of the hydraulic oil;
      wherein the computation maps include a first map and a second map setting the relationship of the valve characteristic value with respect to the engine control value, with a varying amount of the valve characteristic amount corresponding to a change in the engine control value being set to be smaller in the second map than the first map; and
      the control unit switches the computation maps from the first map to the second map when an engine speed is in a low speed range and the detected temperature of the hydraulic oil is relatively high.

6. The controller according to claim 5, wherein the detector estimates the temperature of the hydraulic oil based on at least either one of an engine coolant temperature and a cumulative value of an intake air amount in a most recent predetermined period.

7. The controller according to claim 6, wherein the internal combustion engine transmits drive force to a vehicle drive system with a continuously variable transmission which continuously varies a gear ratio.

8. The controller according to claim 5, wherein the internal combustion engine transmits drive force to a vehicle drive system with a continuously variable transmission which continuously varies a gear ratio.

* * * * *